(12) United States Patent
Alahautala et al.

(10) Patent No.: US 6,698,907 B1
(45) Date of Patent: Mar. 2, 2004

(54) METHOD AND DEVICE FOR COUPLING LIGHT SOURCES TO A LIGHT GUIDE

(75) Inventors: Taito Alahautala, Tampere (FI); Pekka Savolainen, Tampere (FI); Ville Häyrinen, Tampere (FI)

(73) Assignee: Oseir Oy, Tampere (FI)

( * ) Notice: Subject to any disclaimer, the term of this patent is extended or adjusted under 35 U.S.C. 154(b) by 0 days.

(21) Appl. No.: 09/869,427

(22) PCT Filed: Dec. 30, 1999

(86) PCT No.: PCT/FI99/01094
§ 371 (c)(1),
(2), (4) Date: Sep. 27, 2001

(87) PCT Pub. No.: WO00/40893
PCT Pub. Date: Jul. 13, 2000

(30) Foreign Application Priority Data

Dec. 30, 1998 (FI) .................................. 982835
Dec. 30, 1998 (FI) .................................. 982836

(51) Int. Cl.$^7$ ............................................. G01D 11/28
(52) U.S. Cl. ...................... 362/26; 362/31; 362/244; 362/555; 372/43; 385/34

(58) Field of Search .............................. 362/31, 26, 561, 362/555, 331, 553, 27, 558, 244, 246; 372/43, 6, 22, 27, 34; 385/15, 115, 34

(56) References Cited

U.S. PATENT DOCUMENTS

| 4,185,891 | A | * | 1/1980 | Kaestner ..................... 385/33 |
| 4,730,883 | A | | 3/1988 | Mori ........................ 350/96.1 |
| 4,818,062 | A | * | 4/1989 | Scifres et al. ................. 372/9 |
| 4,820,010 | A | * | 4/1989 | Scifres et al. ................ 385/33 |
| 5,249,104 | A | | 9/1993 | Mizobe ....................... 362/31 |
| 5,410,454 | A | | 4/1995 | Murase et al. ................ 362/31 |
| 5,769,532 | A | | 6/1998 | Sasaki ....................... 362/237 |
| 5,790,576 | A | | 8/1998 | Waarts et al. ................ 372/43 |
| 5,810,463 | A | | 9/1998 | Kawahara et al. ............. 362/31 |

* cited by examiner

Primary Examiner—Sandra O'Shea
Assistant Examiner—John Anthony Ward
(74) Attorney, Agent, or Firm—Swidler Berlin Shereff Friedman, LLP (57) ABSTRACT

A method for coupling several non-radial light sources to a light guide having an input end, where the light guide has, in a cross-section perpendicular to the direction of propagation of light, an at least partly curved form, and the light sources are coupled on the edge region at the input end of the light guide.

38 Claims, 6 Drawing Sheets

METHOD AND DEVICE FOR COUPLING LIGHT SOURCES TO A LIGHT GUIDE

The invention relates to collecting and focusing light from semiconductor light sources. Semiconductor light sources are presently under intensive research and development, and their field of application has been highly expanded. This is due to e.g. the small size, free controllability and high efficiency of the light sources.

Semiconductor lasers are used e.g. in communication, optical pumping of lasers, material machining, surgical operations, printers, and a variety of scientific devices. To provide high luminosity, it is possible to couple both several single diode lasers on top of each other or in parallel (stack and line lasers) and also line lasers on top of each other (matrix). A typical example of the system of several diode lasers is presented in U.S. Pat. No. 5,790,576 disclosing the coupling of a matrix structure, consisting of several lines of diode lasers, to an optical fibre by means of optical elements.

Diode lasers often produce an elliptical far-field whose maximum and minimum aperture values often differ greatly from each other. Elliptical (more generally: non-radial) fields are conventionally focused e.g. by means of cylinder lenses and/or diffraction gratings. A non-radial field refers to the far-field of a light source where the intensity distribution in the cross-sectional plane is not radial but for example elliptical or almost line-shaped, such as the far-field of the diode laser. The problem is often how to focus and conduct the light from several separate sources to an object in a simple and effective manner. As far as is known, it has not been possible to couple the light from several diode lasers to a light guide in a simple and effective manner and to focus it with the same device.

It is an aim of the invention to present a method by which it is possible to couple the light from several light sources producing a non-radial field into a light guide. In the method, any separate fibre system or lenses are not necessary to transfer light into the light guide, but the light sources can be attached directly to the end of the light guide. Depending on the shape of the light guide, the method can be used to couple light into a fibre or to focus light for other purposes.

This aim is attained by the method of the invention in such a way that the light guide has an at least partly curved cross-section in a direction perpendicular to the direction of propagation of the light, and light sources are coupled on the periphery of the light guide. When the main axes of the far-fields of the light sources are parallel to the tangent of the curve of the cross-section of the light guide, no collimation optics will be necessary, and light can be evenly spread into the light guide. The device of the invention, in turn, consists of a light guide whose outer surface is at least partly curved, and of non-radial light sources coupled on the periphery of the light guide. The coupling is preferably effected without optics between the light guide and the light sources in such a way that the main axis of the far-field is substantially parallel to the tangent of the outer surface of the light guide.

In view of the use and structure of the light guide, the invention has also other preferred embodiments which will be discussed below.

In the following, the invention will be described in more detail with reference to the appended drawings, in which FIG. 2b shows another alternative for the embodiment of FIG. 2a, FIG. 3 shows, in an end view, an almost closed circular light guide, another light guide being placed on its open part.

Figure 1A:
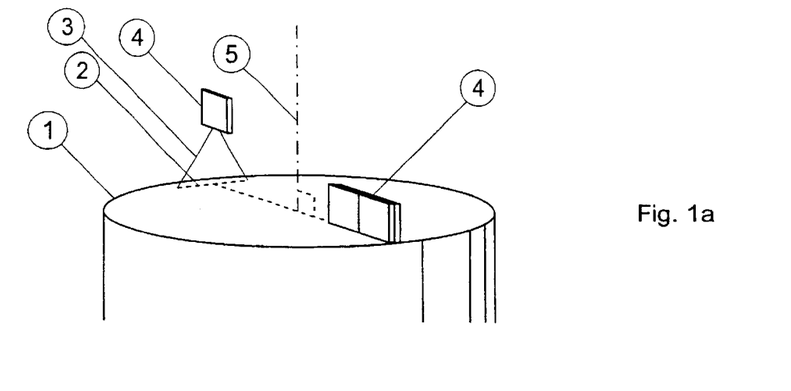
FIG. 1a shows the placement of light sources in a light guide in a perspective view.
Figure 1B:
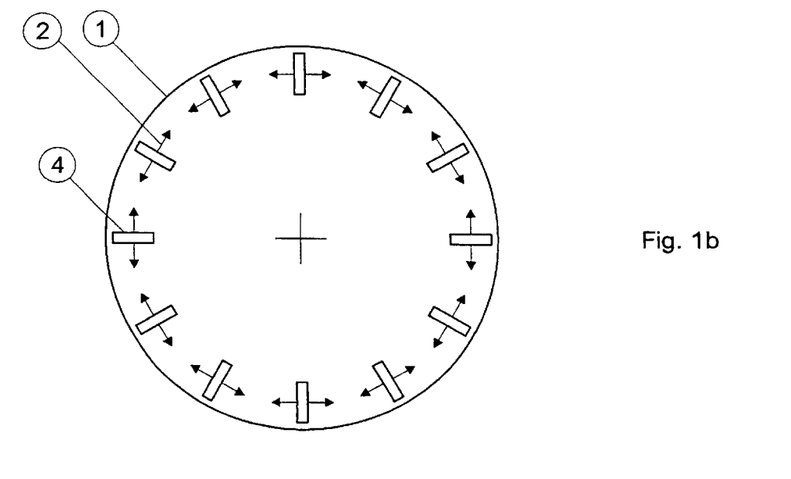
FIG. 1b shows the placement of light sources at the end of the light guide in an end view.

FIGS. 1a and 1b illustrate the principle of coupling of light sources 4. The light source 4 is coupled to a light guide 1 in such a way that the main axis 2 of the far-field 3 of the light source is parallel to the tangent of the cross-section of the circular light guide. Hereinbelow, the cross-section refers to the cross-section perpendicular to the direction of propagation of light. In FIG. 1a, the optical axis of the system, which is also the axis of rotation of the light guide component, is indicated with the reference numeral 5. Due to the way of coupling, the luminosity coupled to the guide is distributed over the periphery of the guide and remains in the guide by means of total reflection. With this principle, high efficiency of coupling is achieved. There can be an air gap between the light source 4 and the end of the light guide 1, which causes the field coupled to the light guide to become narrower than the field produced by the light source itself in the air. This effect is caused by the refraction of light on the interface. There are several light sources 4 on the periphery of the light guide 1 to achieve the desired total luminosity, and they are coupled to the light guide at different locations on the periphery of the curved cross-section of the light guide. The main axes of the far-fields of the light sources 4, placed at different locations on the periphery of the light guide, are at an angle with respect to each other, the angular difference corresponding approximately to the angle between the tangent planes extending through the outer surface of the light source at respective locations.

The light guide 1 acts as a waveguide based on either the total reflection (difference in the refractive indexes of the periphery of the light guide and the ambient material) or specular reflectivity (reflective coating on the periphery of the light guide). The field coupled to the guide is distributed over the periphery of the guide during a length which becomes the shorter, the wider the angular distribution of light from this light source is. When propagating in the light guide, the field is distributed on the periphery and exits from the light guide as a radial field. If there are several light sources 4, their fields become overlapped.

FIG. 1b shows the placement of several separate light sources 4 on the periphery of the light guide 1 preferably at even angular intervals. The separate light sources can be single diode lasers or lasers packed in various ways to form an entity of several lasers, e.g. matrices, of which one example is shown in FIG. 1a, on the right. If lasers are packed in parallel e.g. in the radial direction of the cross-section of the light guide 1, they will be placed at different radial distances from the outer periphery of the light guide.

Figure 2A:
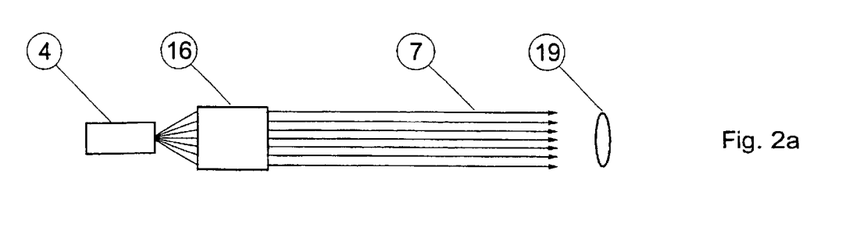
FIG. 2a shows the use of collimating optics between a light source and a light guide.
Figure 2B:
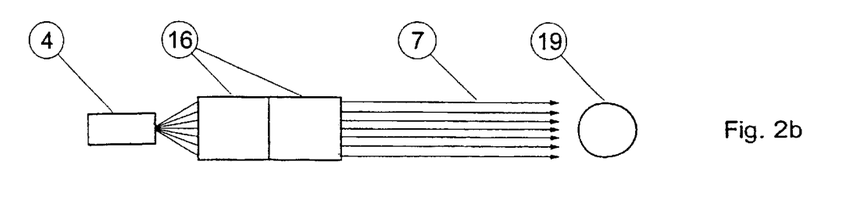

FIGS. 1a and 1b show the coupling of non-radial light sources 4 on the periphery of the light guide 1 directly, without optics therebetween, wherein the light is coupled to the input end of the light guide, corresponding to the shape of the far-field of the light sources 4. FIGS. 2a and 2b show how collimating optics 16 can be used between the light sources 4 and the input end of the light guide, in FIG. 2a a microlense, which makes the rays coming from the light source 4 parallel but maintains the cross-sectional form 19 of the beam due to the non-radial feature of the far-field. Also diffracting optics can be used for collimation. FIG. 2b shows an alternative in which the collimating optics 16 comprises, after a micro lens, also a prism which distributes parallel rays of light in a direction perpendicular to the main axis of the far-field, reducing the non-radial part, wherein the result can be a circular cross-sectional form 19 of the beam. Using the optical arrangement of FIG. 2b between each light source 4 and the input end of the light guide 1, the light sources 4 can be placed on the periphery of the light guide 1 also in such a way that the main axes of their far-fields come in random positions with respect to the curve of the cross-sectional form of the light guide 1. If the light source 4 is a set (e.g. matrix) consisting of several semiconductor lasers, common optics can be used for the lasers.

Figure 3:
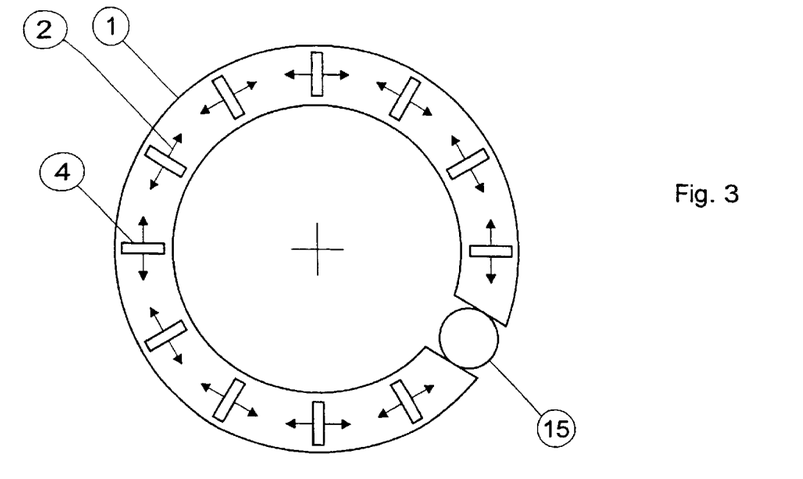
Figure 4:
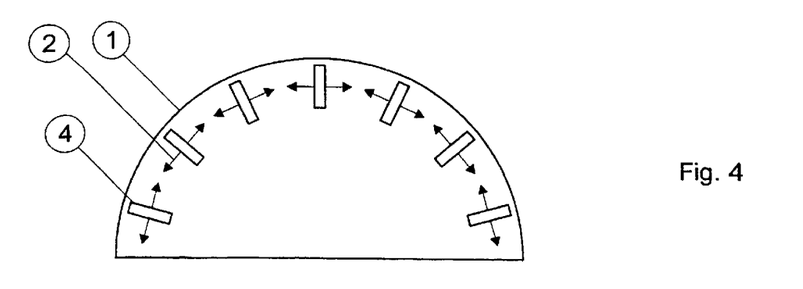
FIG. 4 shows, in an end view, a curved light guide.
Figure 5:
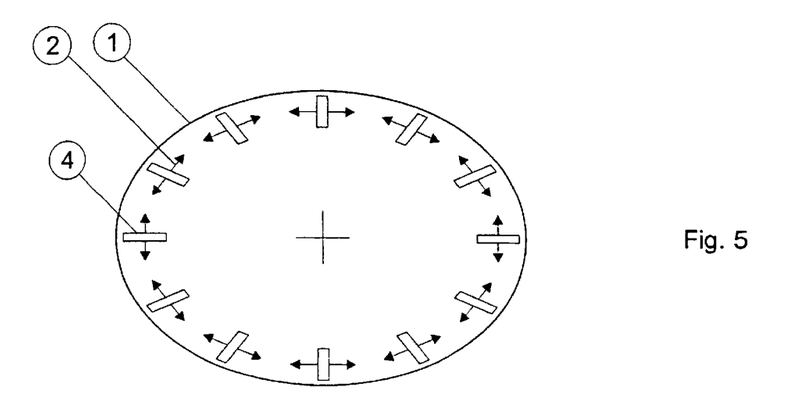
FIG. 5 shows, in a cross-sectional view, an elliptical light guide.

FIGS. 3 to 5 show light guides which differ, in their cross-section perpendicular to the direction of travel of the light, from circular bar-like or tubular light guides. However, these light guides always have a curved outer surface, wherein the light sources 4 can be placed so that the main axis of the non-radial far-field is substantially parallel to the tangent of this curve. FIG. 3 shows an almost closed tubular light guide 1 with a circular cross-section, a second light guide 15, e.g. an optical fibre, being placed in the open part of the periphery and extending in the longitudinal direction of the light guide 1. There can be several optical fibres, and they can also be placed in grooves made on the periphery of the light guide. FIG. 4 shows a part of a bar-like light guide, which in the case shown in the figure is a semi-circle, but its angular extension can also be less or more than 180°, and it can also have the shape of an arch, wherein it has an outer arc and an inner arc. FIG. 5 shows an example that the cross-section of the light guide 1 is not necessarily circular, but it can be different, whereas the cross-section of the light guide 1 can still be a closed tubular ring or bar. In this case, the cross-section is elliptical.

In all the FIGS. 3 to 5, several light sources 4 are placed evenly along the curve, to distribute light more evenly on the area of the cross-section of the light guide 1. Here, it is also possible to apply the principle of FIG. 1b, i.e. there can be several light sources at different radial distances from the centre of the curvature.

Figure 6:
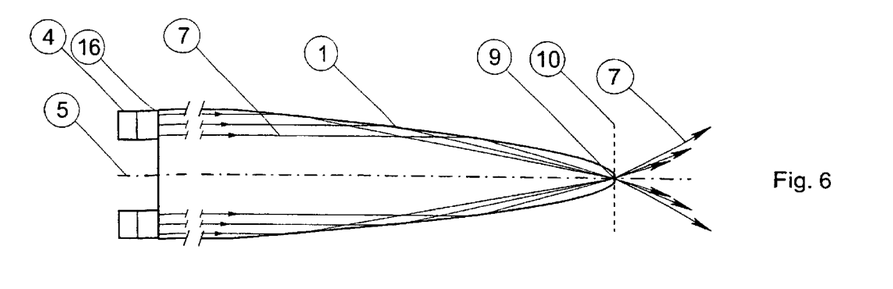
FIG. 6 shows a paraboloid light guide in a side view.
Figure 7:
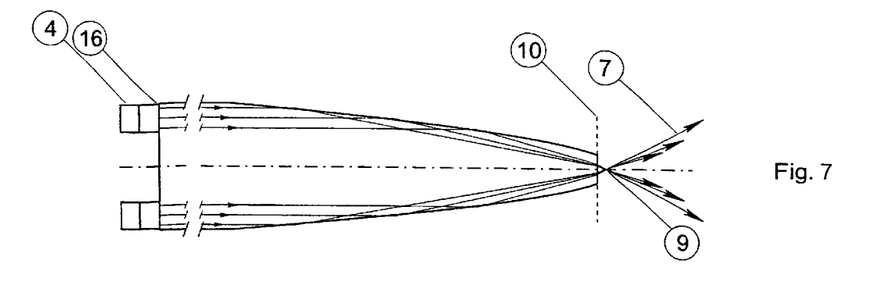
FIG. 7 shows another paraboloid light guide in a side view.

FIG. 6 shows a paraboloidal light guide, i.e. the light guide has the shape of a paraboloidal body of revolution, the axis of rotation being the central axis 5 of the light guide. The tip of the light guide is cut from a plane 10 extending through the focus 9 of the paraboloid. To secure the reflection of light propagating inside the guide, from the interface consisting of the periphery of the guide back into the guide, the walls of the guide have a reflective mirror coating. With the above-presented longitudinal design of the light guide 1, the light sources 4 at different angular positions can be coupled simultaneously to the light guide 1 and focused to the same focal point 9 of the paraboloid. In this way, a great luminosity (or intensity) is achieved. If the paraboloid is cut at the focus 9, the light can be focused to the interface of the tip. By cutting the paraboloid higher than the focus (closer to the end of location of the light sources 4, i.e. the input end of light), as shown in FIG. 7, the result is a device whose focus 9 is placed outside the tip of the light guide 1. Thanks to the focused high luminosity, the device can be used as a knife. If the tip is cut at the level of the focus 9, the device will only cut on the interface between the tip of the light guide and the material to be cut. If the tip is cut higher than the focus 9 of the paraboloid, light is focused outside the tip of the light guide, and the knife will cut in the area outside the tip.

Figure 8:
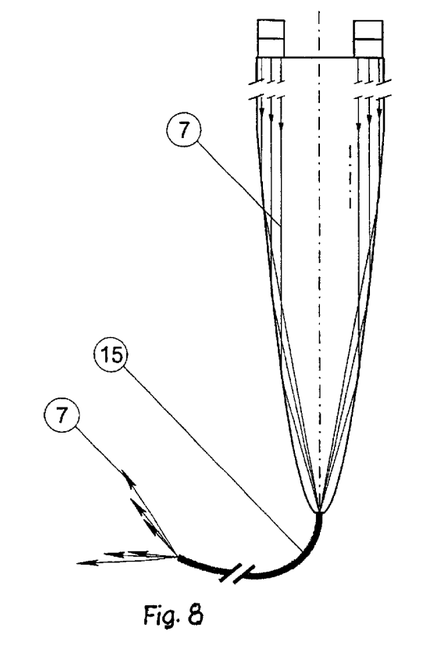
FIG. 8 shows the coupling of light into a fibre in a side view of the light guide.

FIG. 8 shows the coupling of light to a fibre 15 by means of the light guide 1. The end of the fibre is placed in or in the vicinity of the focus 9 of the paraboloidal light guide. The light guide complies with FIG. 6 or 7.

Figure 9:
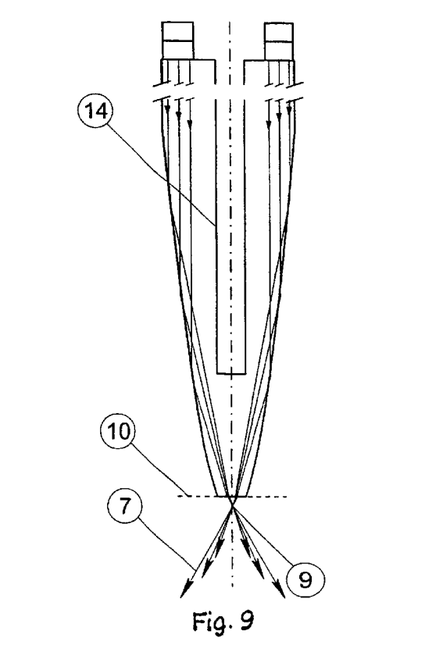
FIG. 9 shows a structural alternative for the light guide in a side view.

FIG. 9 shows an implementation in which there is a hole 14 inside the paraboloidal light guide 1, extending in the axial direction and starting from the end of location of the light sources 4. The internal hole of the light guide makes it possible to bring possible imaging optics to the vicinity of the object in the case the light guide is otherwise long. An optical surface is accomplished at the end of the hole inside the light guide e.g. by means of a low viscosity glue.

Figure 10:
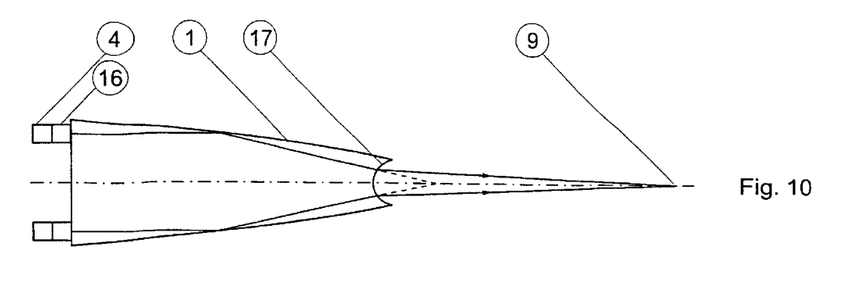
FIG. 10 shows a tip design in a paraboloid light guide.
Figure 11:
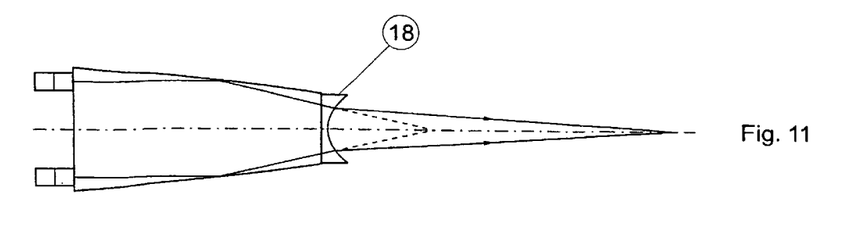
FIG. 11 shows another tip design in a paraboloid light guide.

FIG. 10 shows how the focus 9 can be shifted by the design of the tip 17 of the paraboloid light guide 1. Whereas in FIGS. 7 and 9, the tip 17 is designed by cutting it evenly perpendicularly to the direction of propagation of light, in FIG. 10 the location of the focus 9 is shifted further by arranging the tip 17, i.e. the output end of light, to have a shape similar to dispersing optics, that is, the interface between the light guide and the environment is concave. This diverges the focus 9 farther from the distance which it would have if the interface were plane, and the output aperture of the light is simultaneously reduced. In FIG. 11, the corresponding divergence of the focus 9 is achieved with a particular diverging lens 18 which has a planar surface to be attached to the planar tip of the light guide and whose other surface, where the light exits, is concave. Collimating optics, or collimating and dispersing optics 16 is used between each light source 4 and the light guide 1, as shown in FIG. 2a or 2b. The lens 18 can also be focusing in such a way that it brings the focus closer.

Figure 12:
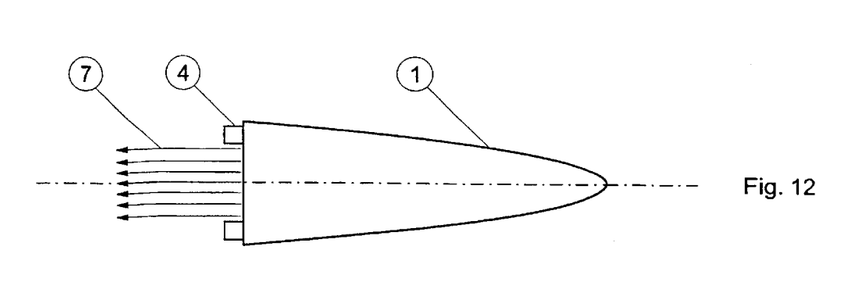
FIG. 12 shows the generation of uniform illumination by means of a paraboloid light guide.

FIG. 12 shows a special arrangement, in which the input end and the output end of the light guide 1 are, in a way, the same surface. The light sources 4 are placed on the periphery of the light guide by arranging the main axes of their far-fields to be parallel with the tangents of the periphery of the light guide 1. The outer surface of the paraboloidal light source is used as a reflecting surface, wherein, at least on those areas in which total reflection does not work, it is formed as a specular reflecting surface by coating it with a suitable material. The paraboloid can also be a hollow body of revolution made of metal, whose inner surface is mirror finished by polishing and which is possibly coated with a specular reflecting material. At the same time, this sets the minimum requirements for the light guide, i.e. its periphery must form an interface from which the light propagating inside the light guide can be reflected. The rays of light 7 are reflected back in parallel, and they leave the light guide through the same planar surface to which the far-field of the light sources 4 is directed, and the rays of light 7 leave the light guide from the middle of the light sources 4 placed in a circle. Using a paraboloidal mirror as the light guide 1, uniform illumination is achieved, and light coming from the light guide 1 can be used directly for illumination, it can be further coupled to another light guide, e.g. a light guide bar whose periphery has a specular surface, it can be optically redirected, e.g. focused or diffused, and also otherwise used in an expedient way. In the case shown in FIG. 12, the light sources are coupled to the end of the light guide 1 directly, without intermediate optics, wherein, due to the orientation of their far-field, the light circulates in the light guide in the direction of its periphery and is evenly dispersed in the same way as in the coupling principle shown in FIG. 1b. The interface of the light guide of FIG. 12 can also be the surface of a body of revolution narrowing towards the tip, other than paraboloid, for example a conical surface.

Figure 13:
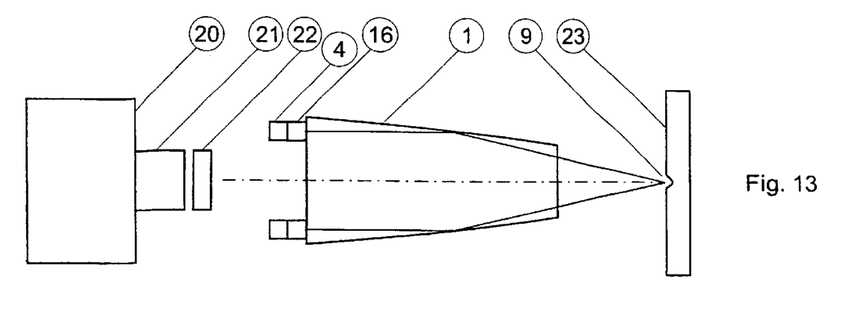
FIG. 13 shows material processing and its direct visualization by means of a paraboloid light guide.

FIG. 13 illustrates the use of a paraboloidal light guide 1 for processing of an object and simultaneous visualization of the process. The paraboloidal light guide 1, light sources 4 and collimating or collimating and dispersing optics 16 being placed on the periphery of its input end, is cut in such a way that it has a planar tip 17, wherein the focus 9 is outside the tip. A material 23 is processed by means of light power concentrated in the focus 9. At the same time, the processing is monitored with a camera 20 directed through the light guide 1 to the input end, wherein the image can be simultaneously transmitted to e.g. a computer and/or a monitor. The object is visible through the tip 17 to the light guide 1 and through the light guide 1 by means of light entering the camera 20, which is scattered laser light or spontaneous thermal emission. There can be a suitable filter 22 between the imaging optics 21 of the camera, e.g. a telecentric objective, and the light guide 1, to remove spontaneous thermal emission or laser light.

Figure 14:
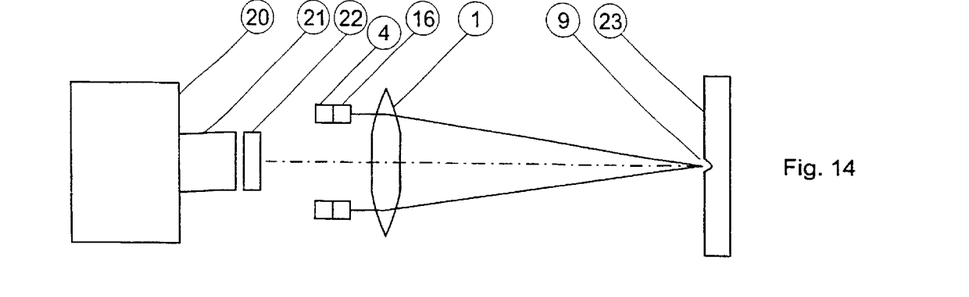
FIG. 14 shows an alternative for the embodiment of FIG. 13 in the middle by the means of a planar light guide.

FIG. 14 indicates that the light guide 1 can also be an optical, focusing lens with a circular cross-section, whose central part forms a window with an even thickness, through which the object can be observed with a similar arrangement as in FIG. 13. The outer edge of the light guide 1 has refracting power, and the light sources 4 are directed via optics 16 to this outer edge, wherein they produce a light focused on the material 23, thanks to the refractive power of the lens.

The invention is not limited to the above embodiments. The light guide can also have a constant cross-section on almost all of its length. Such a circular light guide can be a solid bar or tube. A tubular light guide makes it possible to place the optics inside the guide in those embodiments in which the device of the invention is used for illuminating and imaging an object, wherein the imaging optics can be brought close to the object. A bar-like light guide, in turn, is more durable in its structure and easier to construct.

The light guide 1 itself can be of any suitable material which is transparent at the wavelength of visible light, e.g. glass. The light guide can also be assembled, in its longitudinal direction, of various material pieces which are joined at their interfaces e.g. with a glue suitable for optical use. As already mentioned above, the light guide can also be such a piece whose hollow inner surface is used as a mirror.

The invention has, inter alia, the following uses:
Material Cutting and Marking

The device according to the invention can be used for material processing, such as welding, engraving, cutting or marking. The device focuses light from several non-radial light sources to the interface of the tip of the light guide, or outside the tip.

Surgical Knife

An optical device which can be used e.g. in medicine for surgical operations or for destroying unwanted tissues by thermal treatment. The device focuses light originating from several diode lasers to the tip of a paraboloidal bar. The focal point is located right underneath the tip or on the interface between the tip and the object. The focusing of the light is quickly reduced upon moving away from the focal point, wherein the device is safe.

Illuminating an Object

The device according to the invention provides intensive illumination of a small area, for which reason the device can be used for visualization with high magnification.

Stroboscopic Illumination

A stroboscope made possible by the method is particularly well suitable for the examination of fast movements at a very high temporal accuracy and/or with high magnification. For example, diode lasers as light sources can be easily pulsed. Furthermore, it is possible in the device to use several diode lasers of different wavelengths and different types, which produce completely identical illumination but can be freely controlled with respect to time. An implemented and tested device contained 16 diode lasers (680 nm), whereby the resulting total luminosity is in the order of 30 watts with pulses of 1 microsecond. The tested device could be used to provide freely programmable pulses and pulse series.

Coupling of Light to a Fibre

An optical device which can be used to couple the luminosity of several diode lasers to an optical fibre to be conducted long distances along the fibre.

In the following, we shall still describe possible structures of light guides intended to illuminate an object.

Figure 15:
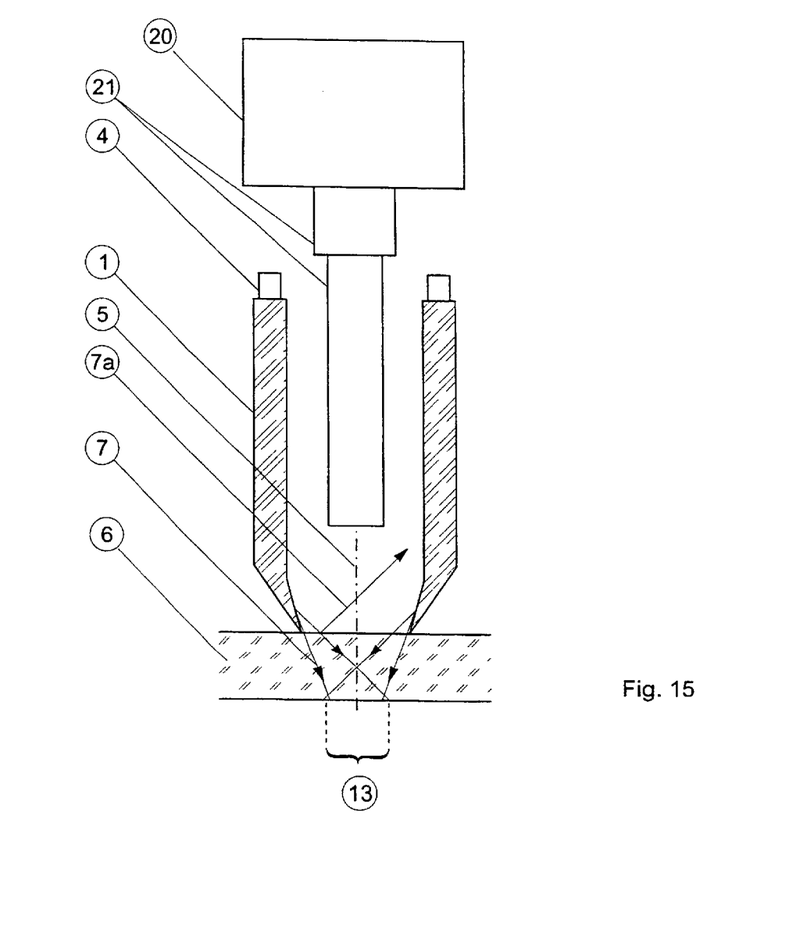
FIG. 15 illustrates the visualization of an object behind a window surface with a tubular light guide whose tip is designed for the purpose.

The imaging system according to the invention comprises a camera 20, imaging optics 21, light sources 4, and a tubular light guide 2 (FIG. 15). The imaging optics 21 can be brought inside the light guide pipe to the vicinity of an object or window to be observed, which makes access to even narrow places possible. The imaging optics can be e.g. a conventional objective, a telecentric objective, or an endoscope.

FIG. 15 illustrates the visualization of an object 23 behind a window 6 so that there are no disturbing window reflections. The light guide 1 conveying light to the object can be made long, wherein it is possible to observe objects in a narrow place. For example, an endoscope 21 is installed inside a tubular light guide 1. Non-radial light sources 4, such as diode lasers, can be coupled directly or via optics 16 to the input end of the light guide 1 in the above-described manner.

The optics 21 of the imaging device of FIG. 15 can also be placed outside the light guide 1. The optics 21 used, whereby a relatively high magnification is obtained, can be e.g. a telecentric objective, a micro-telescope, or another objective with a long focal length. The imaging device, i.e. camera 20, can be for example a film camera or a semiconductor camera, such as a CCD camera.

Using the method of the invention, the object can be illuminated through a window, from the same side from which the viewing is accomplished, without any disturbing window reflections. Due to the shape of the tip of the light guide 1, no rays 7b are reflected from the window surfaces onto the optical axis 5 to the location of the aperture of incidence of the imaging optics 21. Furthermore, the light can be directed to the target area 13 in an efficient and accurate manner, wherein no luminosity is lost. The device can be optimized to illuminate almost perpendicularly or diagonally from the direction of viewing, depending on the situation. Visualization without a window is possible as well, wherein the advantage offered by the invention is high efficiency in directing the light to the target area. The light guide 1 can be long and narrow, which makes access to narrow places possible.

Light is coupled to one end of the light guide tube with a shaped tip, ie. to the input end, and at the other end, i.e. the output end, the light is directed (focused) to the target area. Total reflections on the walls of the pipe of the light guide 1 distribute the luminosity more evenly on the periphery of the guide. Light propagates by internal total reflections in the walls of the guide. The efficiency of the propagation can be improved by specular coating of the outer wall, particularly when the angular distribution of the light to be coupled is high.

Light is coupled to the light guide 1 at its planar-cut and polished input end. If the light to be coupled to the light guide has an angular distribution, the luminosity is distributed more evenly than collimated light onto the periphery of the tube, thanks to internal reflections. Light distributed evenly on the periphery exits the tube as a radial field.

Figure 16:
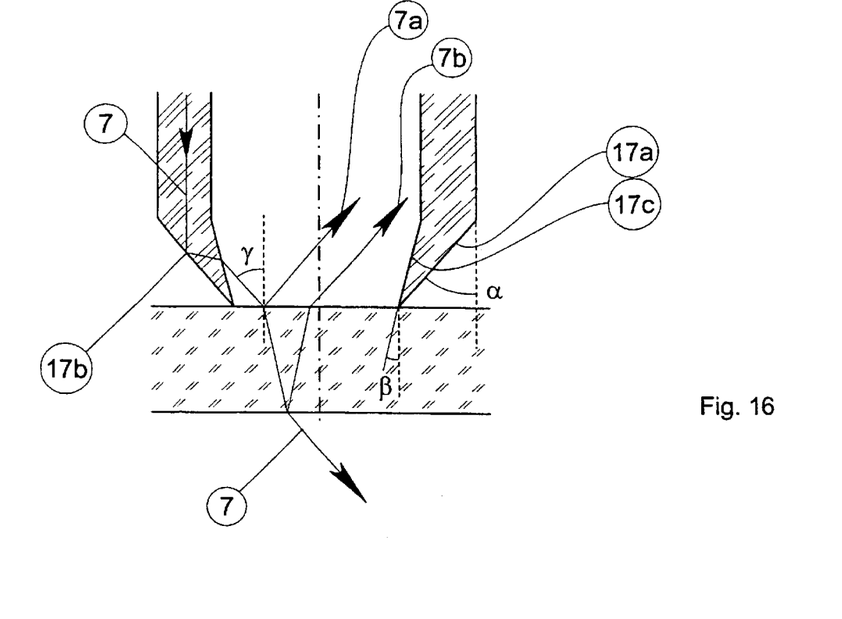
FIG. 16 shows the propagation of light rays in a shaped tip of a light guide.

FIG. 16 illustrates more precisely the propagation of rays of light in the shaped tip 17 of the light guide tube. Total reflection or specular reflection (point 17*b*), takes place from the outer periphery 17*a* of the shaped tip which is at a sharp angle $\alpha$ to the longitudinal direction of the light guide 1, wherein light propagates through a possibly diagonal (sharp angle $\beta$ to the longitudinal direction of the light guide 1) inner periphery 17*c*, is reflected from the interface, and propagates diagonally (angle $\gamma$) towards a window 6. The angle $\beta$ of the inner periphery of the tip 17, which is smaller than the angle $\alpha$ in FIG. 18, determines the minimum angle at which light can exit from the guide. Rays 7*a* and 7*b* reflected from the window surfaces do not fall on the aperture of incidence of the optics 21.

Consequently, at the light-directing end of the light guide tube, internal reflection from the angle $\alpha$ of the outer periphery 17*a* takes place either as specular reflection or as internal total reflection, wherein light exits through the wall of the inner periphery 17*c* of the tube. In addition to the fact that the possible angle $\beta$ at the inner periphery 17*c* of the point 17 of the tube is used to limit the minimum angle at which light can exit the tube, the angle $\beta$ also affects the direction of the illumination. Glareless illumination, i.e. illumination without disturbing reflections, is based on the fact that the ray exiting at the minimum angle $\beta$ is not reflected from window surfaces to the optical axis 5 at the point where the aperture of incidence of the optics 21 is located. In the figures, the central axis (indicated with a dash and dot line) in the longitudinal direction of the tubular light guide 1 is also the optical axis 5. The angle $\gamma$ of incidence of the ray of light on the window can be calculated from the formula:

$$\gamma=90°+\beta-\arcsin[np\cdot\sin(90+\beta-2\alpha)],$$

in which np is the index of refraction of the light guide tube.

Figure 17:
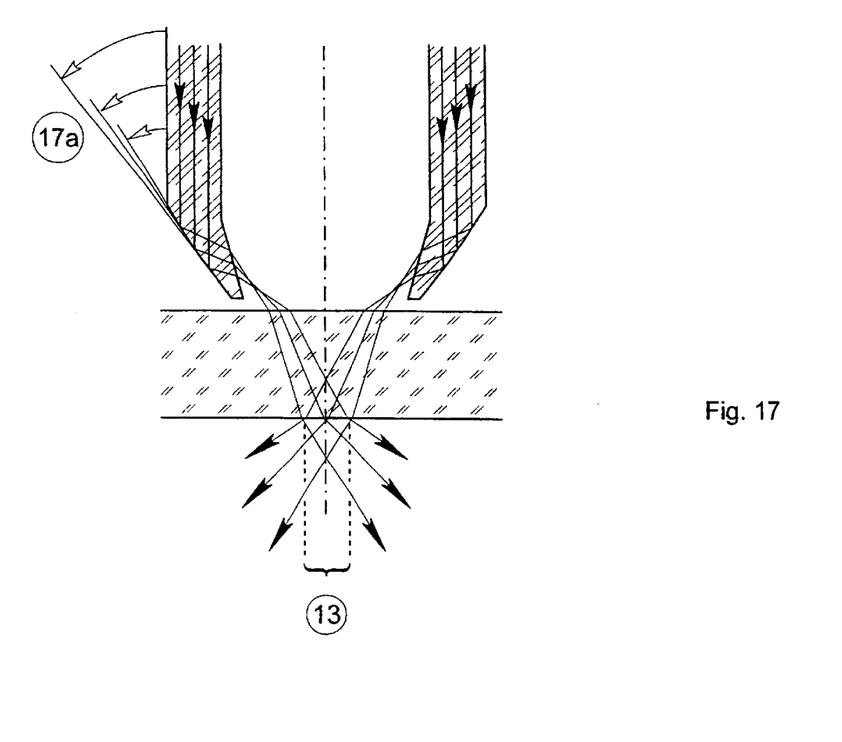
FIG. 17 shows an alternative for the design of a shaped tip of a light guide.

FIG. 17 shows the shaped tip 17 of the light guide, on whose outer periphery 17*a* there are several angles, i.e. the angles $\alpha$ vary. The angles direct the rays 7 propagating at different radial distances in the tube more together, wherein the same luminosity can be focused on a smaller area 13. One angle $\alpha$ according to FIG. 4 directs the rays propagating at different radial distances in parallel to the window 6 and through the same. If the angular distribution of incident light is small, a circular area can be illuminated on the object plane, whose radius varies upon changing the distance of the tube from the window. The width of the illuminated ring depends on the angular distribution. With more angles at the outer periphery 17*a* of the tip 17 of the light guide 1, as shown in FIG. 17, it is possible to select different exit angles for the rays 7 propagating radially at different locations in the guide 1, which affects the width of the illuminated area 13. Again, if the angular distribution of incident light is small, rings can be developed on the object plane. Due to the different exit angles, the rings have different radii, and with the combined effects, a wider focused illuminated ring is obtained than with a pipe which only contains one angle. In FIG. 17, the angles $\alpha$ grow towards the tip, which causes the outer periphery 17*a* to act in a focusing manner. This can be achieved with straight portions related to each other but having different angles. The outer wall can also have a paraboloidal shape. In view of uniformity of the illumination, the paraboloid is the ideal shape. A paraboloidal surface can be made e.g. by rounding angles abraded to slightly different angles. In a corresponding manner, the angles $\alpha$ can be reduced towards the tip, wherein the periphery 17*a* diffuses parallel rays 7. In a manner analogical to what has been presented above, the outer wall can consist of straight portions joined to each other, or it can be concave. A tip 17 which diffuses parallel rays can be advantageous for illuminating a wider area at a close range.

In FIGS. 16 and 17, the angle $\beta$ is smaller than the angle/angles $\alpha$, but this is not a necessary feature in view of operation of the invention. The inner periphery 17*c* of the guide 1 can also comprise several angles $\beta$, or it can be curved.

Furthermore, it is shown in FIG. 17 how the interfaces 17*c* and 17*a* do not necessarily converge to a fully sharp tip, but the tip is cut to improve mechanical strength. Because the tip is located outside the extension of the longitudinal surface of the light guide before the interface 17*c* (away from the light guide 1), straight rays 7 incident in the longitudinal direction of the light guide do not fall upon this tip. To prevent reliably the loss of light which falls upon the tip at other angles at this location, it must have a specular coating. Similarly, to avoid deflection through the first interface 17*a*, caused by the angular distribution of light incident in the longitudinal direction of the light guide 1 (angles deviating from the longitudinal direction), also the first interface 17*a* is preferably equipped with a specular reflection surface.

The angle of the inner periphery of the shaped tip of the light guide can be made in the following way: The end of a tube is melted, wherein the end becomes tear-shaped. An angle can be abraded and finished inside the tube by means of a conical tool at the end of a shaft. After this, the tip of the tube to be shaped is strengthened to make an external angle. Strengthening refers to protecting the sharp tip to be made by plugging the tube before machining and abrading the angle of the outer periphery. Next, the external angle is made e.g. in a lathe. The tip can also be made separately and attached to the tube e.g. by glueing.

The light guide 1 can also have another shape than the cross-section of an annular tube. In principle, the same reflection and refraction is obtained with a light guide whose tip 17 comprises the above-mentioned angles but whose cross-sectional form can be e.g. a curved plate; in other words, the cross-sectional views of FIGS. 16 and 17 could be cut in the longitudinal direction of a planar light guide 1. Such light guides can be placed e.g. on both sides of the optical axis 5 in such a way that they illuminate symmetrically a common target area 13.

In the following, we shall still discuss briefly some practical uses of the embodiments of FIGS. 15 to 17.

The visualizing examination of industrial processes often requires that an optical lead-through is placed in a location to be imaged. There are often limits to arranging a window and illuminating the object through this window. The device shown in FIGS. 15 to 17 provides a solution for such a situation. The same applies to visualization of an object behind a phase interface, a film, a plastic, etc.

The embodiment of FIGS. 15 to 17 can also be used for visualizing a bare object. The advantage to be obtained with the device in the visualization of a bare object is the effective conduction of light to the target area and diagonally incident light, which in most cases improves the contrast. The device is also narrow and it can be made long, wherein it is possible to visualize objects which are accessible through a narrow access path.

The embodiment of FIGS. 15 to 17 is also suitable for use in a stroboscope. Such a stroboscope is particularly well suitable for examining fast movements with a very high magnification.

In all the above contexts, the term "illumination" should be understood in a wide meaning, both as continuous illumination of the object and as short, pulse-like illumination implemented e.g. with a laser, wherein the exposure times can even be very short.

What is claimed is:

1. A method for coupling several non-radial light sources to a light guide having an input end, where the light guide has, in a cross-section perpendicular to the direction of propagation of light, an at least partly curved form, and the light sources are coupled on the edge region at the input end of the light guide.

2. The method according to claim 1, wherein the light sources are coupled in such a way that the main axis of the far-field of the light sources is substantially parallel to the tangent of the curve of the cross-sectional form of the light guide.

3. The method according to claim 1, wherein collimation optics is used between the light sources and the light guide, whereby the rays of light produced by the light sources are made parallel with respect to each other.

4. The method according to claim 3, wherein the collimation optics is also used to diverge rays of light in a direction perpendicular to the main axis of the far-field, for example to a beam with a circular cross-section.

5. The method according to claim 1, wherein the light sources are coupled to a paraboloid used as the light guide.

6. The method according to claim 5, wherein light originating from the light sources is focused by means of the design or structure of the tip of the paraboloid outside the tip of the paraboloid.

7. The method according to claim 6, wherein the tip of the paraboloid is designed as a lens surface.

8. The method according to claim 6, wherein a lens is arranged at the tip of the paraboloid.

9. The method according to claim 5, wherein light is focused into a fiber by means of the light guide.

10. The method according to claim 1, wherein the light sources are coupled to a light guide, whose interface is a rotational surface, such as a paraboloid, and light is reflected back by means of this light guide.

11. The method according to claim 10, wherein the light reflected back is coupled to another light guide.

12. The method according to claim 6, wherein material processing, such as cutting, welding, or marking is performed by means of the light guide.

13. The method according to claim 1, wherein an object is illuminated by means of the light guide.

14. The method according to claim 13, wherein the object is visualized through the light guide.

15. The method according to claim 14, wherein the object is visualized through a light guide whose middle part is planar.

16. The method according to claim 1, in which light is conducted along an elongated light guide and directed to an object to be illuminated at the end of the light guide, wherein at the end of the light guide, the light is directed at an angle to the longitudinal direction of the light guide by reflection from a first interface which is at a sharp angle ($\alpha$) to the longitudinal direction of the light guide, and reflected light is refracted from the light guide towards the object via a second interface.

17. The method according to claim 16, wherein the reflection from the first interface takes place as specular reflection.

18. The method according to claim 16, the reflection from the first interface takes place as total reflection.

19. The method according to claim 16, also the second interface of the light guide is at a sharp angle ($\beta$) to the longitudinal direction of the light guide, the sharp angle ($\beta$) being formed on the same side of the longitudinal line of the light guide as the angle ($\alpha$) formed by the first interface.

20. The method according to claim 16, light exits from different sides of the symmetrically optical axis in such a way that rays refracted via the interfaces are directed to a common target area.

21. The method according to claim 20, light is conducted along a tubular light guide 4 and light is refracted from the inner periphery of the tube towards the center.

22. The method according to claim 16, light is conducted along a planar light guide with a curved cross-section.

23. The method according to claim 1, an object behind a transparent material with a reflective surface, such as a window is illuminated by means of the light guide.

24. The method according to claim 16, the object is observed with an endoscope and/or a CCD camera.

25. The method according to claim 1, the light sources are semiconductor lasers.

26. The method according to claim 25, wherein the light sources used simultaneously include different types of semiconductor lasers.

27. A device for coupling several non-radial light sources to a light guide having an input end, the device comprising:
   a light guide which is an at least partly curved in the cross-section perpendicular to the direction of propagation of light, and
   non-radial light sources which are placed on the edge region at the input end of the light guide.

28. The device according to claim 27, the light sources are placed in such a way that the main axis of the far-field of the light sources is substantially parallel to the tangent of the curve of the cross-sectional form of the light guide.

29. The device according to claim 27, at least collimating optics is placed between the light sources and the input end of the light guide.

30. The device according to claim 27, wherein the light guide is a paraboloid.

31. The device according to claim 30, the tip of the paraboloid is designed in such a way or its structure is such that the focal point of light conducted along the paraboloid is outside the tip of the paraboloid.

32. The device according to claim 31, the tip of the paraboloid is a lens surface.

33. The device according to claim 31, a lens is arranged at the tip of the paraboloid.

34. The device according to claim 27, wherein the interface of the light guide is a rotational surface, such as a paraboloid, and it forms a reflective surface to reflect light back via the input end.

35. The device according to claim 27, wherein at the end of the light guide there is a first interface which is at a sharp angle ($\alpha$) to the longitudinal direction of the light guide and which forms a reflective surface to direct light at an angle to the longitudinal direction of the light guide by reflection, and a second interface to refract light from the light guide towards the object.

36. The device according to claim 35, wherein also the second interface of the light guide is at a sharp angle ($\beta$) to the longitudinal direction of the light guide, the sharp angle ($\beta$) being formed on the same side of the longitudinal line of the light guide as the angle ($\alpha$) formed by the first interface.

37. The device according to claim 27, wherein the light sources are semiconductor lasers.

38. The device according to claim 37, wherein the light sources consist of two or more sets of semiconductor lasers.

* * * * *